United States Patent
Viertel et al.

(10) Patent No.: US 6,812,301 B2
(45) Date of Patent: Nov. 2, 2004

(54) METHOD FOR PRODUCING HOMOPOLYMERS OR COPOLYMERS OF PROPENE

(75) Inventors: Günter Viertel, Bornheim (DE); Axel Hamann, Kerpen (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/312,858

(22) PCT Filed: Jun. 28, 2001

(86) PCT No.: PCT/EP01/07411

§ 371 (c)(1),
(2), (4) Date: Aug. 6, 2003

(87) PCT Pub. No.: WO02/02656

PCT Pub. Date: Jan. 10, 2002

(65) Prior Publication Data

US 2004/0030063 A1 Feb. 12, 2004

(30) Foreign Application Priority Data

Jul. 3, 2000 (DE) ......................................... 100 31 392

(51) Int. Cl.⁷ ............................... C08F 2/00; C08F 2/34
(52) U.S. Cl. ............................ 526/61; 526/68; 526/88; 526/901
(58) Field of Search ............................. 526/61, 68, 88, 526/901

(56) References Cited

U.S. PATENT DOCUMENTS 4,330,645 A * 5/1982 Juza et al. ..................... 526/61
6,114,478 A 9/2000 Kersting et al. ............... 526/88

FOREIGN PATENT DOCUMENTS

| DE | 196 45 947 C1 | * | 11/1996 |
| DE | 19645947 | | 11/1996 |
| EP | 038478 | | 10/1981 |
| EP | 0 360 094 | * | 9/1989 |
| EP | 360094 | | 3/1990 |
| EP | 749992 | | 12/1996 |
| EP | 849285 | | 6/1998 |
| EP | 0 906 782 | * | 4/1999 |
| EP | 906782 | | 4/1999 |

* cited by examiner

*Primary Examiner*—Ling Siu Choi
(74) *Attorney, Agent, or Firm*—Keil & Weinkauf

(57) ABSTRACT

For producing homopolymers or copolymers of propylene in the gas phase, gaseous or liquid monomers are introduced into a polymerization zone; the pressure and temperature in the polymerization zone are kept within a range that corresponds to the gaseous state of the monomers; gaseous monomers not consumed by polymerization are discharged from the polymerization zone and liquefied and re-introduced in liquid form into the polymerization zone. The temperature regulation in the polymerization zone is done by means of continuous measurement of the temperature and a change, tripped upon a change in temperature, in the quantity of liquid monomers introduced per unit of time into the reaction zone. To that end, the temperature is measured at a plurality of points vertically offset from one another, and from the respective measured values a respective mean value is formed. The mean values are compared with computed set-point value specifications, and if there are deviations, the quantity of monomers to be fed into the polymerization zone is changed accordingly.

2 Claims, 4 Drawing Sheets

METHOD FOR PRODUCING HOMOPOLYMERS OR COPOLYMERS OF PROPENE

The invention relates to a method for producing homopolymers or copolymers of propylene as generically defined by the preamble to claim 1.

One such method is known from German Patent DE 196 45 947 C1.

In this known method, which in turn is based on a method of European Patent Disclosure EP 38 478 B1, homo- or copolymers of the propylene are produced in the gas phase by providing that gaseous or liquid monomers are introduced into a polymerization zone and polymerized; the pressure and the temperature in the polymerization zone are kept within a range appropriate to the gaseous state of the monomers. Gaseous monomer not consumed by polymerization is discharged from the polymerization zone, liquefied, and re-introduced in liquid form into the polymerization zone. The temperature regulation is performed by means of continuous measurement of the temperature and by means of a change, tripped upon a temperature change, in the quantity of liquid monomers introduced into the polymerization zone per unit of time.

The object of the invention was to embody the known method in such a way that it can be performed with still better success; in particular, the constancy of the properties of the polymer over time is to be improved, and reactor yields are to be further increased.

To attain this object, it is proposed that the temperature in the polymerization zone be measured at a plurality of points offset vertically from one another, and that from the various measured values a respective mean value be formed, that the mean values be compared with computed set-point value specifications and that on the basis of the magnitude and sign of the ascertained difference, the quantity of monomers to be fed into the polymerization zone be changed.

Figure 3:
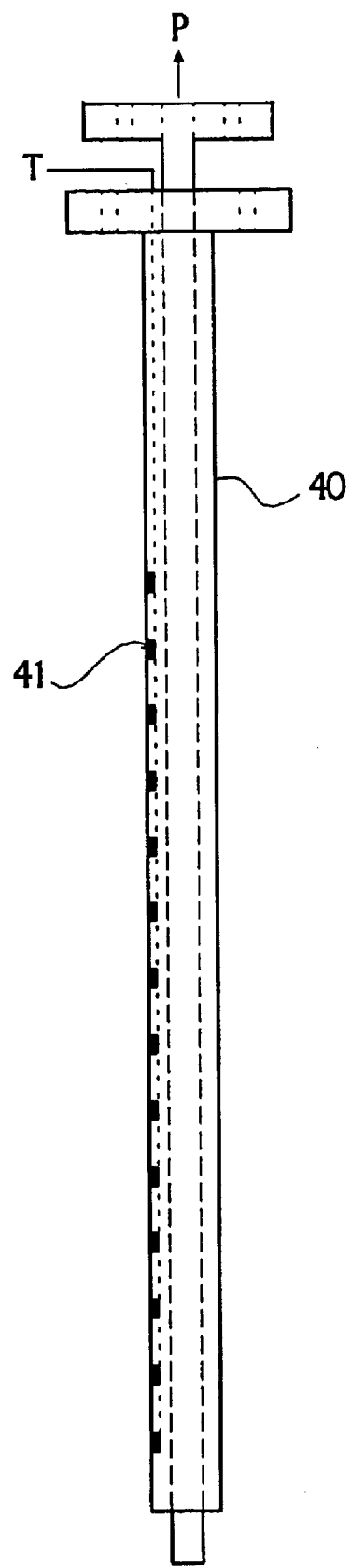

By this means, a largely uniform reaction temperature in the agitated powder bed of the polymerization zone can be achieved. It is especially advantageous if for the temperature measurement a polymer discharge tube of the kind schematically shown in FIG. 3 is used. The polymer discharge tube has a plurality of temperature sensors disposed vertically one after the other and is dipped into the powder bed at a point where the motion of the fine-particle, agitated polymer is especially intensive.

In a further characteristic of the invention, the pressure in the polymerization zone is kept constant with the aid of a compensation container for the condensed monomers carried in circulation. In this way, the level of the circular propylene condenser can be regulated as a function of the reactor pressure, something that is not assured with regulating devices alone.

In a further preferred embodiment of the method of the invention, to the polymer discharged from the polymerization zone, propylene and/or mixtures of $C_2$–$C_8$ hydrocarbons are added by polymerization in a second polymerization zone, at pressures of 10 to 30 bar and temperatures of 30 to 90° C., in order to alter or improve the physical properties of the polymer.

The invention will be described in further detail below in conjunction with the drawings.

In an agitation reactor (1), which in a polymerization zone (2) contains a helical agitator that can be driven from below, propylene homopolymer or copolymer in the gas phase is polymerized in an agitation bed, comprising solid polymer particles with a particle size of 0.5 to 10 mm, by means of a Ziegler-Natta catalyst system. The catalyst components are metered into the polymerization zone separately at (3) and (4). Regulating the molecular weight of the polymer is done with hydrogen, which is metered into the reactor at (15). In general, the reactor pressure is from 10 to 50 bar, preferably 25 to 35 bar, and the temperature of polymerization is from 40 to 150° C., preferably 60 to 90° C. The heat of polymerization is dissipated by evaporation cooling with the aid of excess monomers, in that per t of polymerized propylene, approximately 6–7 t of monomers is introduced into the agitation bed by way of a plurality of split streams and mixed intensively with the polypropylene powder.

The temperature of polymerization of 40 to 150° C. is measured with the aid of the polymer discharge tube (40) that is necessary in the method, combined with 14 temperature sensors (41), at a position in the agitation bed where a particularly intensive motion of the fine-particle polymer occurs.

With the aid of a computer, an arbitrary number of temperature measurements is averaged, depending on the reactor batch and the polymer type to be produced, and this averaged temperature is used to regulate a split flow of liquid monomers, which by evaporation serve to dissipate the heat of polymerization.

The monomers not consumed by polymerization, laden with dustlike polymer particles, flow at a speed of up to 0.5 m/sec through an opening in the reactor head into a reactor dome (5), are brought to the temperature of condensation in this case by liquid circular propylene (6), including dissolved copolymers and fresh propylene that are metered in at (6), and as a result are freed of some of the dustlike polymer entrained with them. For complete dust extraction, the monomers in vapor phase are delivered via a cyclone (7) to a filter (8) and then condensed in the circular gas condenser (9) at vertical tubes; the hydrogen used to regulate the molecular weight for the most part dissolves in the condensed propylene. The undissolved hydrogen component is returned to the reactor (1) with the aid of the ejector (10).

Regulating the reactor pressure of 20 to 40 bar is done with the aid of a container and a rain valve. For example, if an increased polymerization speed has caused the pressure in the reactor to rise, a greater heat-exchange surface area is needed in the circular condenser (9). The rain valve 12 then makes a somewhat larger quantity of liquid monomers available from the condenser than is needed to dissipate the heat of polymerization. As a result, the level of liquid monomers in the container (11) rises, and the level in the circular gas condenser (9) falls and leaves a larger area available for condensation. Regulating the reactor pressure can be kept within narrower limits than before.

With the aid of a pump (13), the monomers serving to dissipate the heat of polymerization are returned to the reactor. A portion of the monomers is put at a higher pressure level via a second pump (14) and is required as a propellant flow to extract hydrogen by suction from the circular gas condenser (9) with the aid of the ejector (10).

The comonomers are delivered to the reactor (1) via regulated quantitative flows (16). The fresh propylene flow (17) is regulated by measuring the level in the container (11). After a dwell time of 50 to 70 minutes, by periodically opening the cock (18) into the container (19), the fine-particle dry polymer formed in the agitation bed (2) of the reactor (1) is fed together with from 10 to 25% of unconverted monomer through the discharge tube (40), which dips into the agitation bed and at the same time serves to measure the reaction temperature. The periodic opening of the cock (18) is controlled by means of a radiometric powder level measurement in the reactor (1).

In the container (19), the polymer is separated from depressurized monomers; the monomers are carried onward for processing, and the polymer is fed with the rotary-vane sluice (20) into the container (21), and in this container (21), with nitrogen in countercurrent, it is freed of remaining monomers at a dwell time of 60 minutes, before being pumped via the rotary-vane sluice (22) for extrusion.

Figure 2:
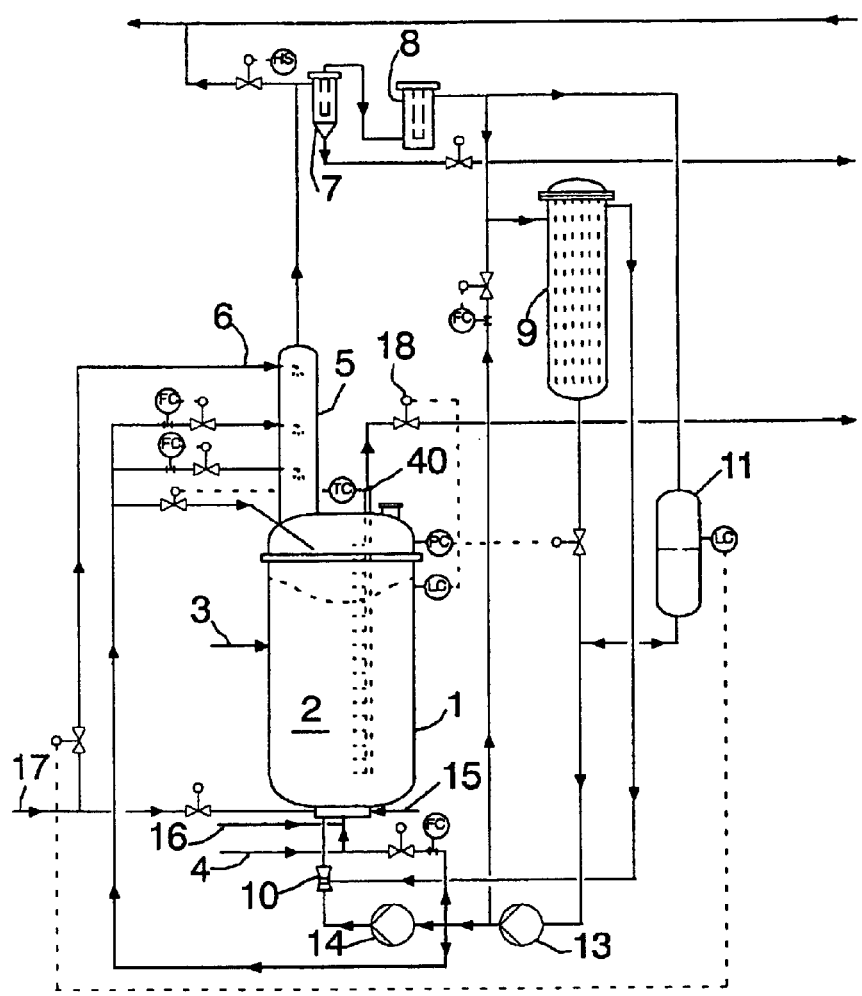
Figure 2A:
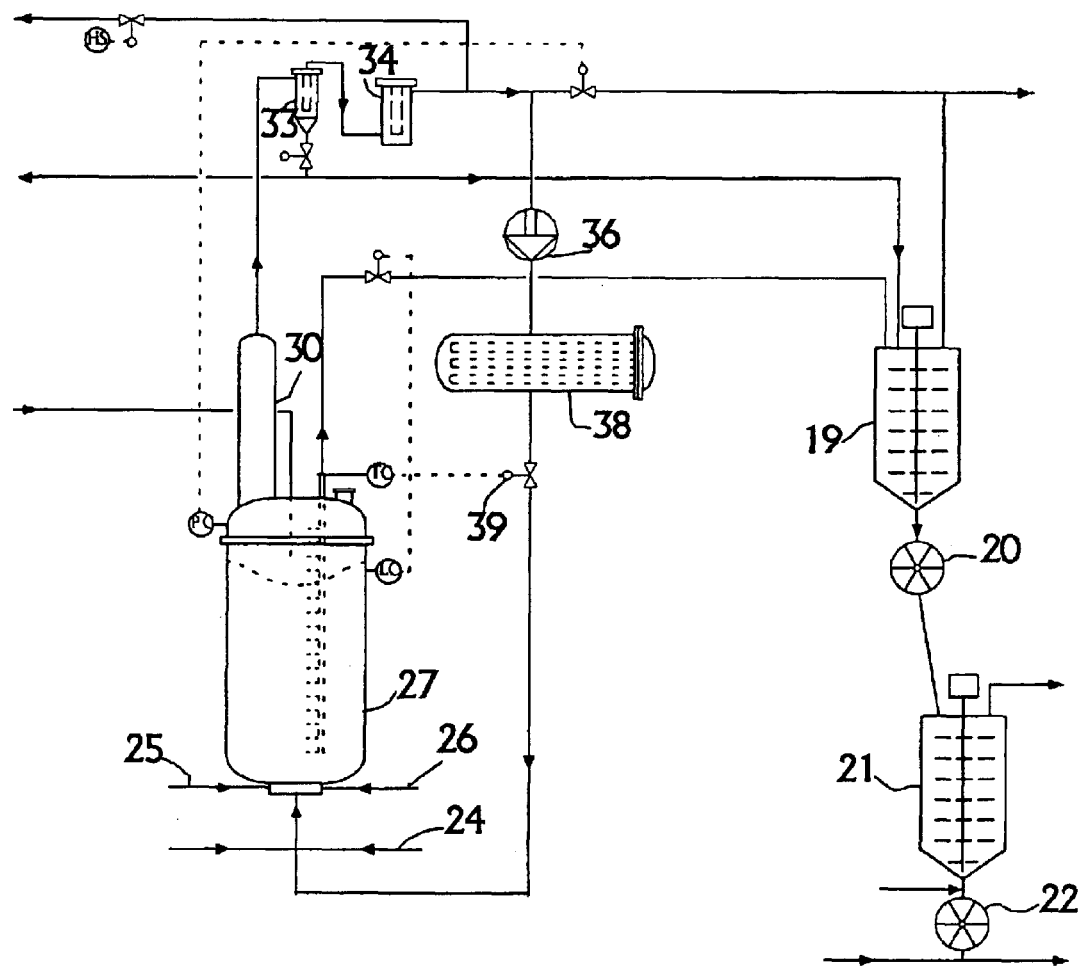

FIGS. 2 and 2A show a reactor cascade, comprising two series-connected reactors with an agitation bed volume of 75 m$^3$ each.

The propylene homopolymer or copolymer polymerized in the first reactor is transferred quasi-continuously, by periodic opening of the cock (18), into the reactor (27) together with propylene or mixtures of propylene and copolymer. The quantity of monomers transferred is 10 to 25 weight-%, in terms of the polymer transferred. In the reactor (27), in the production of propylene homopolymer, not only is the propylene transferred from the first reactor polymerized, but further quantities of propylene (25) are also fed into the reactor.

In the production of copolymers, additional quantities of propylene as well as $C_2$–$C_8$ or $C_4$–$C_8$ hydrocarbons can be used. The regulation of relative molar mass in the reactor (27) is again performed, as in the first reactor (1), with hydrogen (26).

The catalyst transferred with the polymers has such high activity that there is no need for a further addition of catalysts for producing virtually all types of polymer. On the contrary, when comonomers such as ethene are metered in, it is necessary to regulate the activity of the catalyst by adding isopropanol (24). The uncoverted monomers that serve to dissipate the heat of polymerization flow into the reactor dome (30) and are then freed of entrained fine-particle polymer in the cyclone (33) and the filter (34), compressed in the compressor (36), cooled or partly liquefied with coolant or a refrigerant in the circular gas cooler (38) and predominantly returned to the reactor in two phases via the regulating valve (39), to dissipate the heat of polymerization.

Figure 1:
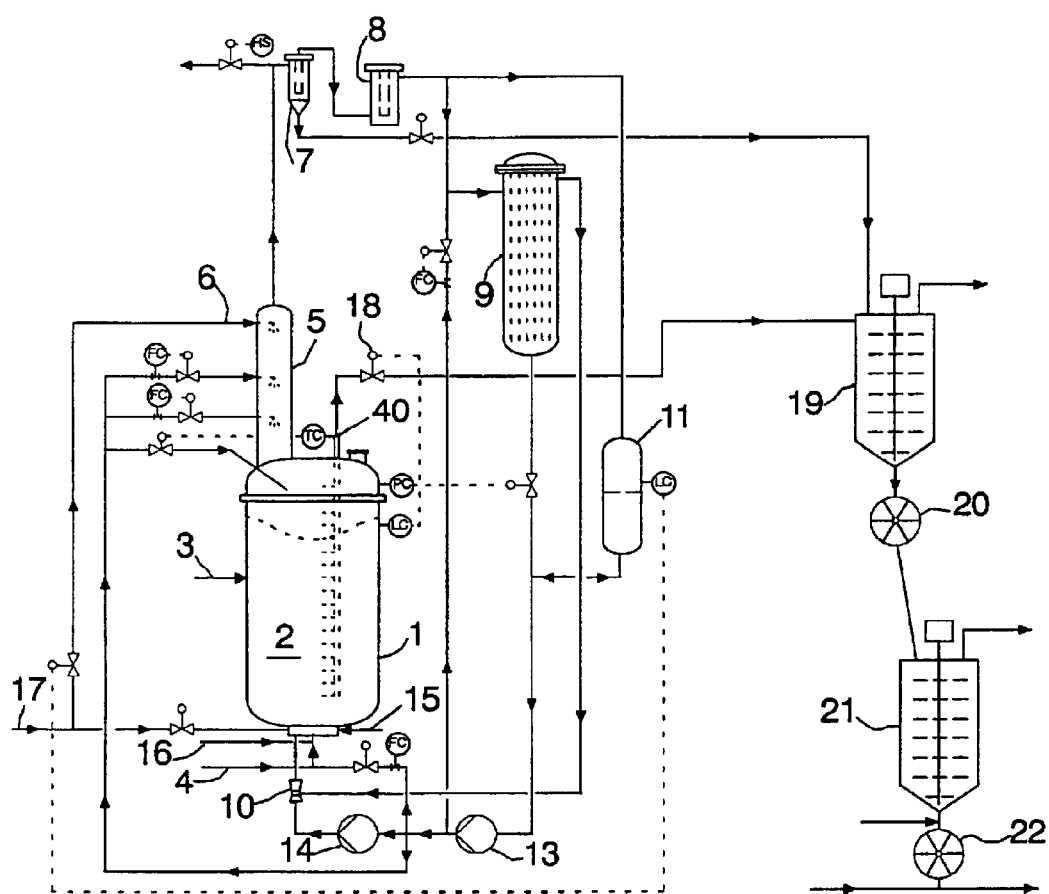

The measurement and regulation of the temperature of polymerization and the discharge of the polymer is likewise done by means of the discharge tube (40) containing temperature sensors (41). The separation of the monomers from the polymer in the agitation container (19), degassing of the polymer, and its transfer to extrusion are as in the method sequence described in conjunction with FIG. 1.

With the method of the invention, the reactor yield and the constancy over time in the polymer properties can be improved substantially. For instance, the yield from a reactor cascade comprising two 25 m$^3$ reactors can be increased from 4 t/h to >12 t/h.

What is claimed is:

1. A method for producing homopolymers or copolymers of propylene by polymerization of suitable monomers by means of a catalyst at temperatures of 40 to 150° C. and pressures of 10 to 50 bar in the gas phase, in which the gaseous or liquid monomer is placed in a polymerization zone and the polymer is discharged from the polymerization zone, and in the polymerization zone the pressure and temperature are kept within a range which corresponds to the gaseous state of the monomers;

gaseous monomers not consumed by polymerization are discharged from the polymerization zone, liquefied in a condenser, stored, and re-introduced in liquid form into the polymerization zone;

the temperature in the polymerization zone is regulated by means of continuous measurement of the temperature and by means of a resultant change, caused upon a change in temperature, of the quantity introduced per unit of time of liquid monomers evaporated in the polymerization zone; and the monomers consumed by polymerization are replaced by delivering fresh monomer, which comprises measuring the temperature in the polymerization zone at a plurality of points offset vertically from one another, and forming a mean value from each of the respective measured values;

comparing the mean values with computed set-point value specifications, and changing the quantities of monomers to be fed into the polymerization zone on the basis of the magnitude and sign of the difference ascertained; and keeping the pressure in the polymerization zone constant by regulating the level of liquefied monomers in the condenser by means of a compensation container for the condensed monomers carried in circulation.

2. The method of claim 1, which further comprises adding to the polymer discharged from the poly-merization zone, propylene and/or mixtures of $C_2$–$C_8$ hydrocarbons and continuing the polymerization in a second polymerization zone, at pressures of 10 to 30 bar and temperatures of 30 to 90° C.

* * * * *